(12) United States Patent
Piccionelli

(10) Patent No.: US 8,292,735 B2
(45) Date of Patent: *Oct. 23, 2012

(54) METHOD, SYSTEM AND APPARATUS FOR LOCATION-BASED GAMING

(75) Inventor: Gregory A. Piccionelli, Westlake Village, CA (US)

(73) Assignee: Koletry Processing L.L.C., Dover, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/068,892

(22) Filed: May 21, 2011

(65) Prior Publication Data

US 2011/0230264 A1  Sep. 22, 2011

Related U.S. Application Data

(63) Continuation of application No. 11/804,054, filed on May 15, 2007, now Pat. No. 7,946,919, which is a continuation of application No. 10/461,171, filed on Jun. 13, 2003, now abandoned.

(60) Provisional application No. 60/389,700, filed on Jun. 14, 2002.

(51) Int. Cl.
*G06F 17/00* (2006.01)
*G06F 19/00* (2011.01)

(52) U.S. Cl. .................. 463/31; 463/1; 463/30; 463/42

(58) Field of Classification Search ............ 463/1, 2, 463/5, 29–34, 40–42; 342/357.2, 358
See application file for complete search history.

(56) References Cited

U.S. PATENT DOCUMENTS

| | | | |
|---|---|---|---|
| 6,287,200 B1* | 9/2001 | Sharma | 463/40 |
| 6,320,495 B1* | 11/2001 | Sporgis | 340/323 R |
| 6,524,189 B1* | 2/2003 | Rautila | 463/40 |
| 6,530,841 B2* | 3/2003 | Bull et al. | 463/42 |
| 6,561,809 B1* | 5/2003 | Lynch et al. | 434/16 |
| 7,435,179 B1* | 10/2008 | Ford | 463/42 |
| 2001/0029011 A1* | 10/2001 | Dagani et al. | 434/11 |
| 2002/0006825 A1* | 1/2002 | Suzuki | 463/40 |
| 2002/0090985 A1* | 7/2002 | Tochner et al. | 463/1 |
| 2002/0111201 A1* | 8/2002 | Lang | 463/2 |
| 2002/0167442 A1* | 11/2002 | Taylor | 342/357.09 |
| 2003/0036428 A1* | 2/2003 | Aasland | 463/29 |
| 2003/0144047 A1* | 7/2003 | Sprogis | 463/9 |
| 2003/0224855 A1* | 12/2003 | Cunningham | 463/41 |
| 2004/0058732 A1* | 3/2004 | Piccionelli | 463/42 |
| 2004/0164897 A1* | 8/2004 | Treadwell et al. | 342/358 |
| 2005/0049022 A1* | 3/2005 | Mullen | 463/1 |
| 2009/0017913 A1* | 1/2009 | Bell et al. | 463/40 |

* cited by examiner

*Primary Examiner* — Milap Shah

(57) ABSTRACT

A method of location-based gaming includes the steps of engaging a program to play a game, determining the location of a target object, providing the location of the target object to a central location, obtaining a data file pertaining to an object at the location of the target object, and generating gaming object data relative to the location of the target object.

22 Claims, 1 Drawing Sheet

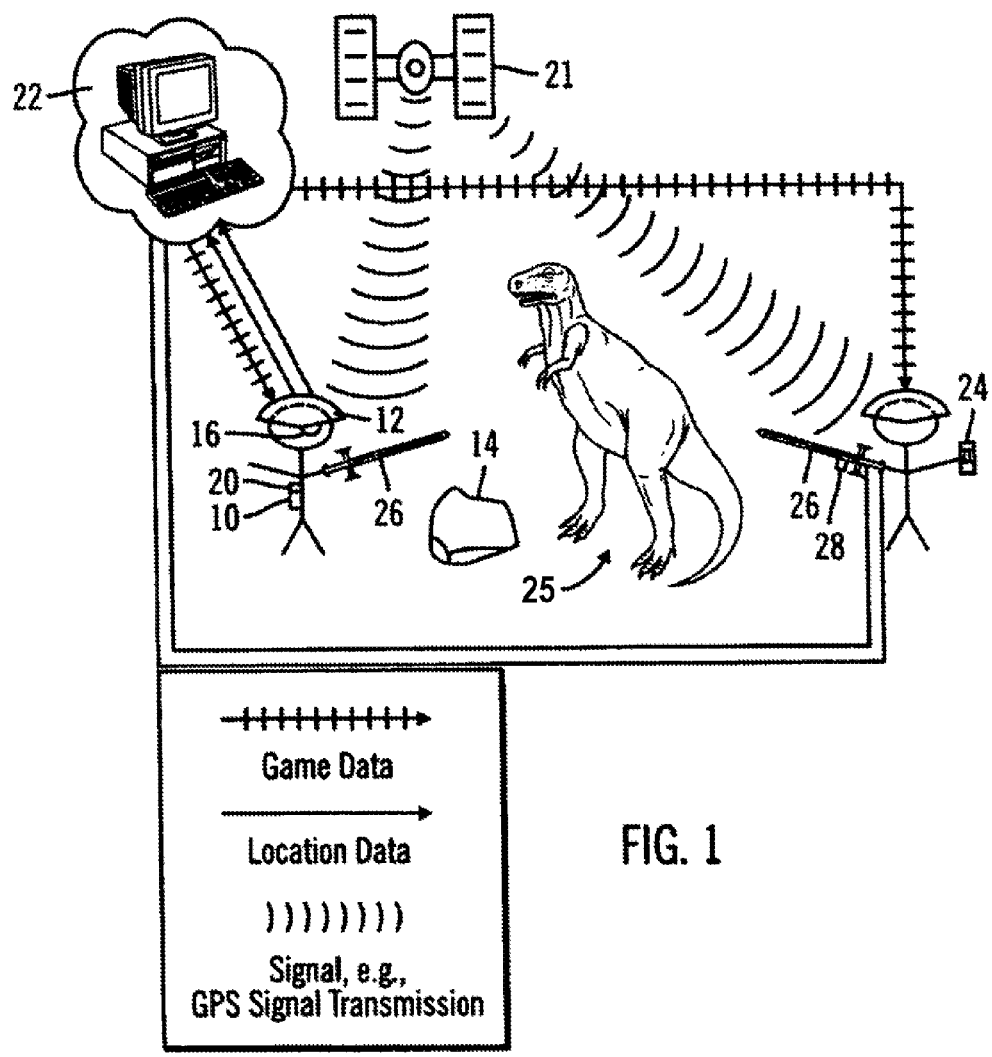

METHOD, SYSTEM AND APPARATUS FOR LOCATION-BASED GAMING

This application is a Divisional Continuation of and claims priority to U.S. patent application Ser. No. 11/804,054, filed May 15, 2007, which is a Continuation of and claims priority to U.S. patent application Ser. No. 10/461,171, filed Jun. 13, 2003 (abandoned), which claims priority to U.S. Provisional Patent Application No. 60/389,700, filed Jun. 14, 2002 (expired), each of which is incorporated herein by reference in its entirety.

FIELD OF THE INVENTION

The present invention relates to a method, system and apparatus for enabling a user to play a computer game or "video game" using information associated with a player or object at a specific location.

BACKGROUND OF THE INVENTION

Recent developments in telecommunications and data processing, and in particular the development of broadband capability in connection with wide-area networks such as the Internet and wireless interfaces to such networks, offer the potential for facilitating the transmission and reception of large amounts of information which may be directed to effectuating an electronic gaming environment in which one or more players may interact with each other and/or computer generated objects. However, at present it is typically necessary for a player to obtain the desired information and play electronic games at a single fixed location, such as a home or office computer, an Internet caf or the like.

A need exists for a method for enabling players to interact with each other or objects in a game, or other persons in relation to the locations of the players, objects and/or other persons.

A need also exists for a system and apparatus for facilitating such methods.

SUMMARY OF THE PREFERRED EMBODIMENTS

In accordance with one aspect of the present invention, there is provided a method of location-based gaming that includes the steps of engaging a program to play a game, determining the location of a target object, providing the location of the target object to a central location, obtaining a data file pertaining to an object at the location of the target object, and generating gaming object data relative to the location of the target object.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which FIG. 1 is a schematic illustrating an example of a method of the invention by which a player identifies, locates, obtains information pertaining to and interacts with a game object and another player, which also illustrates the flow of data between various components employed in the method.

DETAILED DESCRIPTION OF THE PREFERRED EMBODIMENTS

Figure 2A:
FIGS. 2a-b are illustrations of views generated for players 1 and 2 of FIG. 1, respectively.

Turning now to the embodiment illustrated in FIG. 1, a player first engages a program to play a game. The game may be downloaded to the players mobile computing device 10, such as a personal digital assistant, laptop computer or similar device. In some preferred embodiments, the player's mobile computing device may be connected to a heads-up display 12 for the purposes of displaying the game action, objects in the game, other players, scores, remote sensing features and the like.

In some preferred embodiments, the user determines the location of a target object 14, such as another player. In particular, the user determines the location of the target object relative to the user's location. The target object may be another player, a physical object such as a tree, a water source or rock, or merely a selected location in physical space which may be used to correspond to a virtual location in the game. The distance between the user and a target object is determined using a ranging device 16. Appropriate ranging devices include, without limitation, a device having an element that determines the distance or range to a target based on the eye positions of the user (e.g., using a cross-hairs element in the heads-up display); an infrared pointer device; an ultrasonic device; or any other ranging device.

Preferably, the player's mobile computing device 10 also carries a locating element, such as a GPS (Global Positioning System) locator 20 in communication with Global Positioning System 21, that provides the user's location, as well as the orientation of the user (i.e., the direction in which the user is facing). The user's location and orientation, together with the location of the target object relative to the user, thus can be used to determine the location of the target object.

Once the location of the target object has been determined, this location is transmitted to a central location 22, in particular to a central computer. In particular embodiments, the information is transmitted via a wide-area network, such as the Internet, using a device 24 carried by the user, such as, but not limited to, a personal data manager, a cellular telephone having Internet accessibility, etc.

When the central location is provided with the location of the target object, the central location searches for one or more data files pertaining to an object at that location. Such data files can include, without limitation, text files, photographic files, video files, audio files, or dynamically changing data associated with the target object. In some preferred embodiments, such as when the target object is one or more other players, the data regarding the location(s) of the other player(s) may be updated dynamically with new information regarding the present location of the other player(s) in physical space being supplied by one or more devices, such as GPS location devices 20.

Figure 2B:
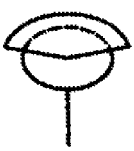

In one preferred embodiment, two players are each equipped with wireless computers capable of detecting their physical locations and transmitting the locations via a wide area network to a gaming computer at central location 22, which coordinates the location of the players with each other and virtual objects generated by the gaming program. The program then generates game object (i.e., virtual object) 25 data, including perspective, size, etc., to the players so that the objects appearing in the heads-up displays 12 of the players appear to realistically change their appearance in relation to the location of the players. For example, if the players are fifty feet apart and across from each other in a large grassy meadow of a park, in some embodiments, the gaming computer would transmit data corresponding to a game object of a dinosaur presented in the heads-up display of the players in proper proportion to appear to be between the players. As the players move, for example, circling the area corresponding to the computer-generated location of the dinosaur game object, the players would receive in their displays a rapidly updated depiction of the game object corresponding to the views one would see if one were traversing around a real object. See FIGS. 2a-b.

In some embodiments, a physical game tool or utensil 26 is also equipped with a location sensing and transmitting means 28. In some embodiments the game tool is a sword which contains GPS location sensing and transmission capability. By the use of such additional devices which can report their location coordinates to the game computer, players may use such utensils in the game. For example, a player might appear to strike the aforesaid virtual dinosaur with the player's sword utensil.

In some particular embodiments, the locations of the players and their actions are incorporated into the game, interact in real time with virtual game objects, such as computer generated dinosaurs, and such interactions and other game objects are displayed in a semitransparent heads-up display 12 which enables the real world to be the backdrop for the game.

In other particular embodiments, the player could play against one or more physical players viewed directly via such semi-transparent heads-up displays, but who appear to be mixed into or otherwise superimposed upon the computer-generated game environments which are transmitted to the players' computers for display via their heads-up displays. The wireless computers may be capable of receiving voice commands via microphones attached to the heads-up displays. In one embodiment, the players could request to play a game in which voice commands are used exclusively.

Gaming object data as described above include video data, such as perspectives, sizes and the like. Further embodiments of the inventive method include additional gaming object data such as audio, tactile and olfactory information. In specific embodiments, one or more scent reservoirs, which are carried, for example, in a headset or other apparatus worn by a player, can be triggered in response to gaming object data generated by the gaming program.

What is claimed is:

1. A method of location-based gaming, the method comprising:
   providing, to mobile computing devices of at least two players, a program executable on the mobile computing devices to play a game between the at least two players;
   receiving location information from at least one of the mobile computing devices, the location information indicating a physical location of at least one player of the at least two players in a physical world;
   receiving from the mobile computing devices a target object location based, at least in part, on the location of one of the at least two players, the target object location being a physical location in the physical world; and
   providing, to the mobile computing devices, data pertaining to a virtual gaming object associated with the target object location, the data for displaying, on a display device of at least one player of the at least two players, the virtual gaming object at a virtual location within the game corresponding to the target object location, the data provided to a given player of the at least two players based on a physical orientation of the given player relative to the target object location and the data updated to reflect changes to the physical orientation of the given player relative to the target object location.

2. The method of claim 1 wherein providing a program comprises providing downloadable software and data for downloading into a player's mobile computing device.

3. The method of claim 1 wherein receiving a target object location comprises receiving a target object location that is based, at least in part, on the physical location of each of the at least two players.

4. The method of claim 3 wherein receiving a target object location comprises receiving a location that is between the physical locations of the at least two players, as the target object location.

5. The method of claim 1 wherein receiving a target object location comprises receiving a location that is between the physical locations of the at least two players, as the target object location.

6. The method of claim 1 wherein receiving a target object location comprises receiving data from at least one player of the at least two players, the received data corresponding to a geographic location.

7. The method of claim 1 wherein receiving a target object location comprises receiving data from at least one of the at least two players, the received data corresponding to a geographic location that is between the physical locations of the at least two players.

8. The method of claim 1, further comprising:
   receiving data, from the at least two players, relating to player interactions with the virtual gaming object; and
   updating and providing to the at least two players, the data pertaining to the virtual gaming object to reflect the player interactions with the virtual gaming object.

9. A method of location-based gaming, the method comprising:
   receiving on an electronic communication device of a first player, a program to enable the first player to play a game;
   determining a physical location of the first player in a physical world;
   receiving, on the electronic communication device, from a server, data pertaining to a virtual gaming object associated with a target object location that is based, at least in part, on the physical location of the first player, the target object location being a physical location in the physical world, the data provided based on a physical orientation of the first player relative to the target object location, and the data updated to reflect changes to the physical orientation of the first player relative to the target object location; and
   causing a display device of the first player to display the virtual gaming object at a virtual location within the game corresponding to the target object location and based on a physical orientation of the first player relative to the target object location, including updating the display device to reflect changes to the physical orientation of the first player relative to the target object location.

10. The method of claim 9 wherein receiving a program comprises downloading software and data into the first player's electronic communication device.

11. The method of claim 9 wherein the target object location is based, at least in part, on the physical location of the first player and the physical location of a second player.

12. The method of claim 11 wherein the target object location is between physical locations of the first and second players.

13. The method of claim 11 wherein identifying a target object location is based on data sent from the first player's communication device, the sent data corresponding to a geographic location that is between the first and second players.

14. The method of claim 9 wherein the target object location is based, at least in part, on the physical location of the first player.

15. The method of claim 9 wherein the target object location is based on data sent from the first player's communication device, the sent data corresponding to a geographic location.

16. The method of claim 9, further comprising:
providing data relating to player interactions with the virtual gaming object; and
receiving updated data pertaining to the virtual gaming object that reflects the player interactions with the virtual gaming object.

17. A system for location-based gaming, the system comprising:
a processor;
a network interface in communication with the processor and coupled to a communication network;
a memory comprising computer executable instructions that, when executed, cause the system to perform operations comprising:
transmitting via the communication network a program executable on a mobile computing device of a first player to enable the first player to play a game;
receiving location information indicating a physical location of the first player in a physical world; and
transmitting to the mobile computing device of the first player, via the communication network, data pertaining to a virtual gaming object associated with a target object location that is based, at least in part, on the physical location of the first player, the target object location being a physical location in the physical world, the data for displaying, on a display device of the first player, the virtual gaming object at a virtual location within the game corresponding to the target object location, the data based on a physical orientation of the first player relative to the target object location and the data updated to reflect changes to the physical orientation of the first player relative to the target object location.

18. The system of claim 17 wherein the target object location is based, at least in part, on the physical location of the first player.

19. The system of claim 17 wherein the operations further comprise receiving from a mobile computing device of a second player location information indicating a physical location of the second player, and wherein the target object location is between the physical locations of the two players.

20. The system of claim 17, wherein the operations further comprise:
receiving data relating to player interactions with the virtual gaming object; and
updating, and providing to the first player, the data pertaining to the virtual gaming object, to reflect the player interactions with the virtual gaming object.

21. A non-transitory computer readable storage medium having stored thereon instructions that, if executed by a computer, cause the computer to perform operations of location-based gaming, the operations comprising:
providing, to mobile computing devices of at least two players, a program executable on the mobile computing devices to play a game between the at least two players;
receiving location information from at least one of the mobile computing devices, the location information indicating a physical location of at least one player of the at least two players in a physical world;
receiving, from the mobile computing devices, a target object location based, at least in part, on the location of one of the at least two players, the target object location being a physical location in the physical world; and
providing, to the mobile computing devices, data pertaining to a virtual gaming object associated with the target object location, the data for displaying, on a display device of at least one player of the at least two players, the virtual gaming object at a virtual location within the game corresponding to the target object location, the data provided to a given player of the at least two players based on a physical orientation of the given player relative to the target object location and the data updated to reflect changes to the physical orientation of the given player relative to the target object location.

22. A non-transitory computer readable storage medium having stored thereon instructions that, if executed by a computing device, cause the computing device to perform operations of location-based gaming, the operations comprising:
receiving on the computing device a program to enable a first player to play a game;
determining a physical location of the first player in a physical world;
receiving, on the computing device, data pertaining to a virtual gaming object associated with a target object location that is based, at least in part, on the physical location of the first player, the target object location being a physical location in the physical world, the data provided based on a physical orientation of the first player relative to the target object location, and the data updated to reflect changes to the physical orientation of the first player relative to the target object location; and
causing a display device of the first player to display the virtual gaming object at a virtual location within the computer game corresponding to the target object location and based on a physical orientation of the first player relative to the target object location, including updating the display device to reflect changes to the physical orientation of the first player relative to the target object location.

* * * * *

UNITED STATES PATENT AND TRADEMARK OFFICE
CERTIFICATE OF CORRECTION

| | |
|---|---|
| PATENT NO. | : 8,292,735 B2 |
| APPLICATION NO. | : 13/068892 |
| DATED | : October 23, 2012 |
| INVENTOR(S) | : Piccionelli |

It is certified that error appears in the above-identified patent and that said Letters Patent is hereby corrected as shown below:

In Column 1, Line 4, delete "is a Divisional" and insert -- is a --, therefor.

In Column 1, Line 33, delete "Internet caf" and insert -- Internet cafe --, therefor.

In Column 2, Line 12, delete "players" and insert -- player's --, therefor.

Signed and Sealed this
Twelfth Day of March, 2013

Teresa Stanek Rea
*Acting Director of the United States Patent and Trademark Office*